(12) United States Patent
Nakamura et al.

(10) Patent No.: US 11,143,107 B2
(45) Date of Patent: Oct. 12, 2021

(54) FUEL GAS HEATER, SUPPORT STRUCTURE FOR FUEL GAS HEATER, AND METHOD FOR CLEANING FUEL GAS HEATER

(71) Applicant: MITSUBISHI HITACHI POWER SYSTEMS, LTD., Kanagawa (JP)

(72) Inventors: Taichi Nakamura, Kanagawa (JP);
Katsuhiro Hotta, Kanagawa (JP);
Masanori Tagashira, Kanagawa (JP);
Kenji Kirihara, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 293 days.

(21) Appl. No.: 16/486,698

(22) PCT Filed: Jan. 17, 2018

(86) PCT No.: PCT/JP2018/001265
§ 371 (c)(1),
(2) Date: Aug. 16, 2019

(87) PCT Pub. No.: WO2018/155015
PCT Pub. Date: Aug. 30, 2018

(65) Prior Publication Data
US 2021/0285377 A1   Sep. 16, 2021

(30) Foreign Application Priority Data

Feb. 22, 2017   (JP) .............................. JP2017-031022

(51) Int. Cl.
*F02C 7/224*    (2006.01)
*F02C 7/22*     (2006.01)
(Continued)

(52) U.S. Cl.
CPC .............. *F02C 7/224* (2013.01); *F02C 7/222* (2013.01); *F02C 7/32* (2013.01); *F02C 3/22* (2013.01);
(Continued)

(58) Field of Classification Search
CPC .. F02C 7/224; F02C 7/222; F02C 7/32; F02C 3/22; F05D 2250/51; F05D 2250/52; F05D 2250/75
See application file for complete search history.

(56) References Cited

U.S. PATENT DOCUMENTS 2,520,755 A * 8/1950 Brown, Jr. ............ F28F 9/0219
                                              165/158
3,948,315 A * 4/1976 Powell ...................... F28D 7/06
                                              165/70
(Continued)

FOREIGN PATENT DOCUMENTS

JP       34-14179       9/1959
JP       50-35535      10/1975
(Continued)

OTHER PUBLICATIONS

International Search Report dated Feb. 13, 2018 in International (PCT) Application No. PCT/JP2018/001265.
(Continued)

*Primary Examiner* — Jesse S Bogue
(74) *Attorney, Agent, or Firm* — Wenderoth, Lind & Ponack, L.L.P.

(57) ABSTRACT

A fuel gas heater includes a container; a gas inflow chamber defined in one end of the container and having a gas inlet; a gas outflow chamber defined in the one end and having a gas outlet; U-shaped heat transfer pipes disposed inside the container, the pipes each having one end communicating with the gas inflow chamber and another end communicat-
(Continued)

ing with the gas outflow chamber; a heating medium supply port; a heating medium discharge port; a gas inflow opening disposed to face positions at which the pipes communicate with the gas inflow chamber; a gas inflow lid that enables the gas inflow opening to be opened and closed; a gas outflow opening disposed to face positions at which the pipes communicate with the gas outflow chamber; and a gas outflow lid that enables the gas outflow opening to be opened and closed.

10 Claims, 6 Drawing Sheets

(51) Int. Cl.
  *F02C 7/32* (2006.01)
  *F02C 3/22* (2006.01)
(52) U.S. Cl.
  CPC ...... *F05D 2250/51* (2013.01); *F05D 2250/52* (2013.01); *F05D 2250/75* (2013.01)

(56) References Cited

U.S. PATENT DOCUMENTS

| | | | | |
|---|---|---|---|---|
| 4,142,578 A | * | 3/1979 | Smith | F28F 9/22 165/134.1 |
| 4,557,322 A | * | 12/1985 | Nipple | F28D 7/06 165/154 |
| 4,778,005 A | * | 10/1988 | Smith | F28D 7/06 165/160 |
| 5,544,700 A | * | 8/1996 | Shagoury | F02C 7/14 165/139 |
| 9,157,685 B2 | * | 10/2015 | Dixon | F28D 7/16 |
| 10,365,044 B2 | * | 7/2019 | Fujita | F28F 9/0131 |
| 2003/0196781 A1 | | 10/2003 | Wanni et al. | |
| 2004/0261395 A1 | * | 12/2004 | Engdahl | F28D 7/085 60/39.465 |
| 2016/0003551 A1 | | 1/2016 | Fujita et al. | |

FOREIGN PATENT DOCUMENTS

| | | |
|---|---|---|
| JP | 63-148067 | 9/1988 |
| JP | 2000-266494 | 9/2000 |
| JP | 2003-314986 | 11/2003 |
| JP | 2007-255723 | 10/2007 |
| JP | 2012-007839 | 1/2012 |
| JP | 2014-137054 | 7/2014 |
| JP | 2014-157001 | 8/2014 |
| JP | 6143985 | 5/2017 |

OTHER PUBLICATIONS

Translation of Written Opinion of the International Searching Authority dated Feb. 13, 2018 in International (PCT) Application No. PCT/JP2018/001265.

Notification of Reason for Refusal dated Jul. 22, 2020 in corresponding Korean Patent Application No. 10-2019-7024247, with English Translation.

* cited by examiner

FUEL GAS HEATER, SUPPORT STRUCTURE FOR FUEL GAS HEATER, AND METHOD FOR CLEANING FUEL GAS HEATER

FIELD

The present invention relates to a fuel gas heater that heats, for example, fuel for use in a gas turbine, a support structure for the fuel gas heater, and a method for cleaning the fuel gas heater.

BACKGROUND

A gas turbine typically includes a compressor, a combustor, and a turbine. The compressor compresses air drawn in through an air inlet port to thereby produce compressed air having high temperature and high pressure. The combustor supplies the compressed air with fuel gas to burn the compressed air, thereby obtaining combustion gas having high temperature and high pressure. The turbine is driven by the combustion gas and drives a generator connected therewith coaxially. The fuel gas to be supplied to the combustor is heated to a predetermined supply temperature by a fuel gas heater. The fuel gas heater includes a container to which a heating medium of the fuel gas is supplied and a plurality of heat transfer pipes that are disposed in the container and through which the fuel gas flows. Thus, heat exchange takes place between the fuel gas that flows through each of the heat transfer pipes and the heating medium supplied to the container. This heat exchange heats the fuel gas.

In the fuel gas heater described above, the fuel gas contains sulfur (S), so that the sulfur may react with iron (Fe) contained in the container or the heat transfer pipe of the fuel gas heater to thereby produce particles of iron sulfide (FeS) as a foreign object. A known technique attempts to remove the foreign object, as disclosed in Patent Literature 1. The fuel gas heater disclosed in Patent Literature 1 discharges fuel gas heated by a heating unit to a centrifugal cavity and generates a swirl flow of the fuel gas in the centrifugal cavity, thereby separating the foreign object from the fuel gas.

CITATION LIST

Patent Literature

Patent Literature 1: Japanese Patent Application Publication No. 2014-137054

SUMMARY

Technical Problem

The known fuel gas heater can separate the foreign object by subjecting the fuel gas discharged from the heating unit to centrifugal separation. The foreign object containing the iron sulfide produced through reaction of the sulfur with iron tends to stick to an inner wall surface of the heat transfer pipe or the container. To remove the foreign object that has stuck to the inner wall surface of the heat transfer pipe or the container, the container or the heat transfer pipe needs to be dismantled. The dismantling requires a large amount of work, which unfortunately leads to an increased maintenance cost of the fuel gas heater.

The present invention has been made to solve the foregoing problem and it is an object of the present invention to provide a fuel gas heater that achieves reduction in maintenance cost.

Solution to Problem

To achieve the object described above, a fuel gas heater according to the present invention includes a container having a hollow shape extending in a horizontal direction; a gas inflow chamber defined in one end portion in a longitudinal direction of the container and having a gas inlet for fuel gas; a gas outflow chamber defined in the one end portion in the longitudinal direction of the container and having a gas outlet for the fuel gas; a plurality of U-shaped heat transfer pipes disposed in an inside of the container, the heat transfer pipes each having one end portion communicating with the gas inflow chamber and another end portion communicating with the gas outflow chamber; a heating medium supply port through which a heating medium is supplied to the inside of the container; a heating medium discharge port through which the heating medium is discharged from the inside of the container; a gas inflow chamber maintenance opening disposed to face positions at which the heat transfer pipes communicate with the gas inflow chamber; a gas inflow chamber open/close lid that enables the gas inflow chamber maintenance opening to be opened and closed; a gas outflow chamber maintenance opening disposed to face positions at which the heat transfer pipes communicate with the gas outflow chamber; and a gas outflow chamber open/close lid that enables the gas outflow chamber maintenance opening to be opened and closed.

Thus, the gas inflow chamber maintenance opening is disposed to face positions at which the heat transfer pipes communicate with the gas inflow chamber and the gas outflow chamber maintenance opening is disposed to face positions at which the heat transfer pipes communicate with the gas outflow chamber, and the gas inflow chamber maintenance opening and the gas outflow chamber maintenance opening are configured so as to be opened by the gas inflow chamber open/close lid and the gas outflow chamber open/close lid, respectively. Thus, removal of the gas inflow chamber open/close lid and the gas outflow chamber open/close lid allows the one end portions of the heat transfer pipes to be viewed from the outside, so that the injection of a blast cleaning material from a cleaning nozzle that is inserted in the one end portion of the heat transfer pipe enables a foreign object stuck on an inner wall surface of the heat transfer pipe to be shaved off by the blast cleaning material that moves through the inside of the heat transfer pipe. As a result, maintenance of the heat transfer pipes can be performed easily within a short period of time and reduction in maintenance cost can be achieved.

In the fuel gas heater according to the present invention, the inside of the container is divided by a bulkhead extending along a vertical direction into a first space and a second space, the gas inflow chamber is disposed adjacent to the bulkhead on an upper side in the first space, the gas outflow chamber is disposed on a lower side in the first space and on the one end portion side of the container, the heat transfer pipes are disposed in the second space, and the end portions of the heat transfer pipes pass through the bulkhead.

Thus, because of the gas inflow chamber being disposed on the upper side in the first space and the gas outflow chamber being disposed on a lower side in the first space and on a side adjacent to an end portion of the container, the gas inlet and the gas outlet for the fuel gas can be disposed on the same side, which leads to reduction in manufacturing cost.

In the fuel gas heater according to the present invention, the gas inlet and the gas outlet are disposed in juxtaposition to each other in the longitudinal direction of the container at an upper portion of the container.

Thus, by disposing the gas inlet and the gas outlet at the upper portion of the container, lines can be connected with the gas inlet and the gas outlet easily even with support structures that may be disposed on both sides of the container to support the container, so that the configuration can be simplified.

In the fuel gas heater according to the present invention, the first space is partitioned by a partition wall that includes a vertical wall extending along the vertical direction and a horizontal wall extending along the horizontal direction to define the gas inflow chamber and the gas outflow chamber, the gas outflow chamber maintenance opening is disposed at the one end portion in the longitudinal direction of the container, and the gas inflow chamber maintenance opening is disposed in the vertical wall.

Thus, the gas inflow chamber and the gas outflow chamber, which are defined by the partition wall disposed to partition the first space, enables the gas outflow chamber maintenance opening and the gas inflow chamber maintenance opening to be disposed easily to face positions at which the heat transfer pipes communicate with the gas inflow chamber and the gas outflow chamber.

In the fuel gas heater according to the present invention, the one end portions of the heat transfer pipes are exposed to an outside of the container through the gas inflow chamber maintenance opening and the gas outflow chamber maintenance opening, and the other end portions of the heat transfer pipes are exposed to the outside of the container through the gas outflow chamber maintenance opening.

Thus, the one end portions and the other end portions of the heat transfer pipes can be easily exposed to the outside of the container through the gas inflow chamber maintenance opening and the gas outflow chamber maintenance opening, respectively, so that workability in maintenance work of the heat transfer pipes can be enhanced.

In the fuel gas heater according to the present invention, the container has a leak heating medium discharge port, disposed at a lower portion of the container, through which the heating medium that has leaked to the gas outflow chamber is discharged.

Thus, the leak heating medium discharge port disposed at the lower portion of the container allows the leaked heating medium to be easily discharged to the outside.

In the fuel gas heater according to the present invention, a leak heating medium detection device is connected with the leak heating medium discharge port.

Thus, the connection of the leak heating medium detection device with the leak heating medium discharge port enables leakage of the heating medium from the leak heating medium discharge port to be detected, so that the heat transfer pipes can be easily detected for damage.

A support structure for a fuel gas heater includes a support pedestal supported by a plurality of support columns disposed on a floor surface. One fuel gas heater according to claim 3 is disposed on the floor surface and another fuel gas heater according to claim 3 is disposed on the support pedestal, and the support columns are disposed alongside the gas inflow chamber or the gas outflow chamber.

Because the support columns are disposed alongside a heavy portion of the fuel gas heater and the gas inlet and the gas outlet are not disposed laterally, the support columns can be disposed close to the fuel gas heater.

A method for cleaning a fuel gas heater according to the present invention, as applied to the above fuel gas heater, includes the steps of removing the gas inflow chamber open/close lid and the gas outflow chamber open/close lid; inserting a cleaning nozzle in the gas inflow chamber through the gas outflow chamber maintenance opening and the gas inflow chamber maintenance opening, and injecting a blast cleaning material from the cleaning nozzle into the one end portions of the heat transfer pipes.

Thus, the removal of the gas outflow chamber open/close lid and the gas inflow chamber open/close lid allows the one end portions of the heat transfer pipes to be viewed from the outside through the gas outflow chamber maintenance opening and the gas inflow chamber maintenance opening. Then, the insertion of the cleaning nozzle in the gas inflow chamber and the injection of the blast cleaning material from the one end portion of the heat transfer pipe enables the foreign object stuck on the inner wall surface of the heat transfer pipe to be shaved off by the blast cleaning material that moves through the inside of the heat transfer pipe. As a result, maintenance of the heat transfer pipes can be performed easily within a short period of time and reduction in maintenance cost can be achieved.

The method for cleaning a fuel gas heater according to the present invention includes a step of causing the blast cleaning material discharged from the other end portions of the heat transfer pipes to collide against a collision plate to recover the blast cleaning material in a recovery box.

Thus, the blast cleaning material discharged from the other end portions of the heat transfer pipes is made to collide against the collision plate and recovered in the recovery box. Thus, the blast cleaning material can be easily recovered and re-used.

Advantageous Effects of Invention

In the fuel gas heater, the support structure for the fuel gas heater, and the method for cleaning the fuel gas heater in accordance with the aspect of the present invention, the gas inflow chamber maintenance opening and the gas outflow chamber maintenance opening are disposed to face the positions at which the heat transfer pipes communicate with the gas inflow chamber and the gas outflow chamber. Thus, maintenance of the heat transfer pipes can be performed easily within a short period of time and reduction in maintenance cost can be achieved.

DESCRIPTION OF EMBODIMENTS

The following details, with reference to the accompanying drawings, a fuel gas heater, a support structure for the fuel gas heater, and a method for cleaning the fuel gas heater according to a preferred embodiment of the present invention. The embodiment does not intend to limit the scope of the invention and, if disclosed in plurality, includes a combination of the various embodiments.

Figure 1:
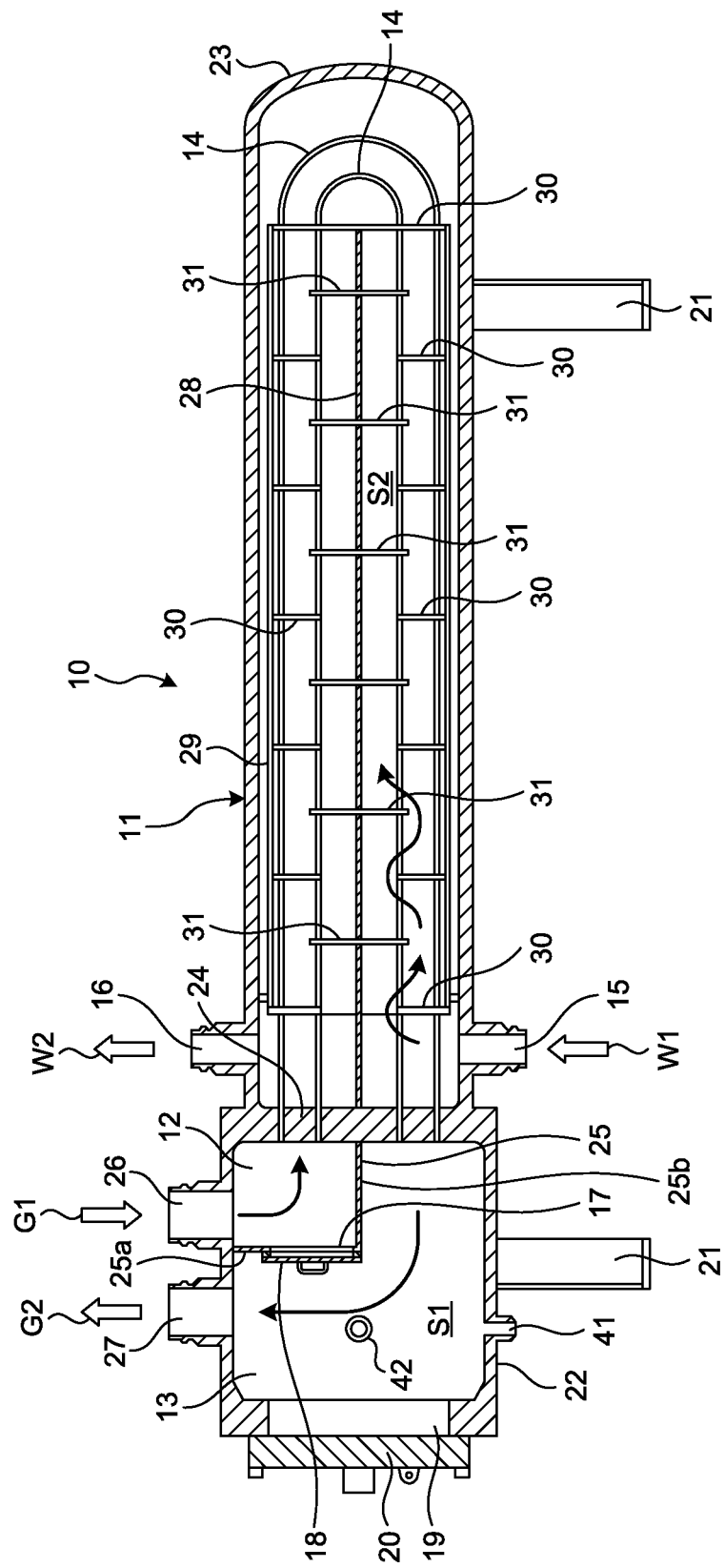
FIG. 1 is a longitudinal cross-sectional view of a fuel gas heater according to an embodiment.
Figure 2:
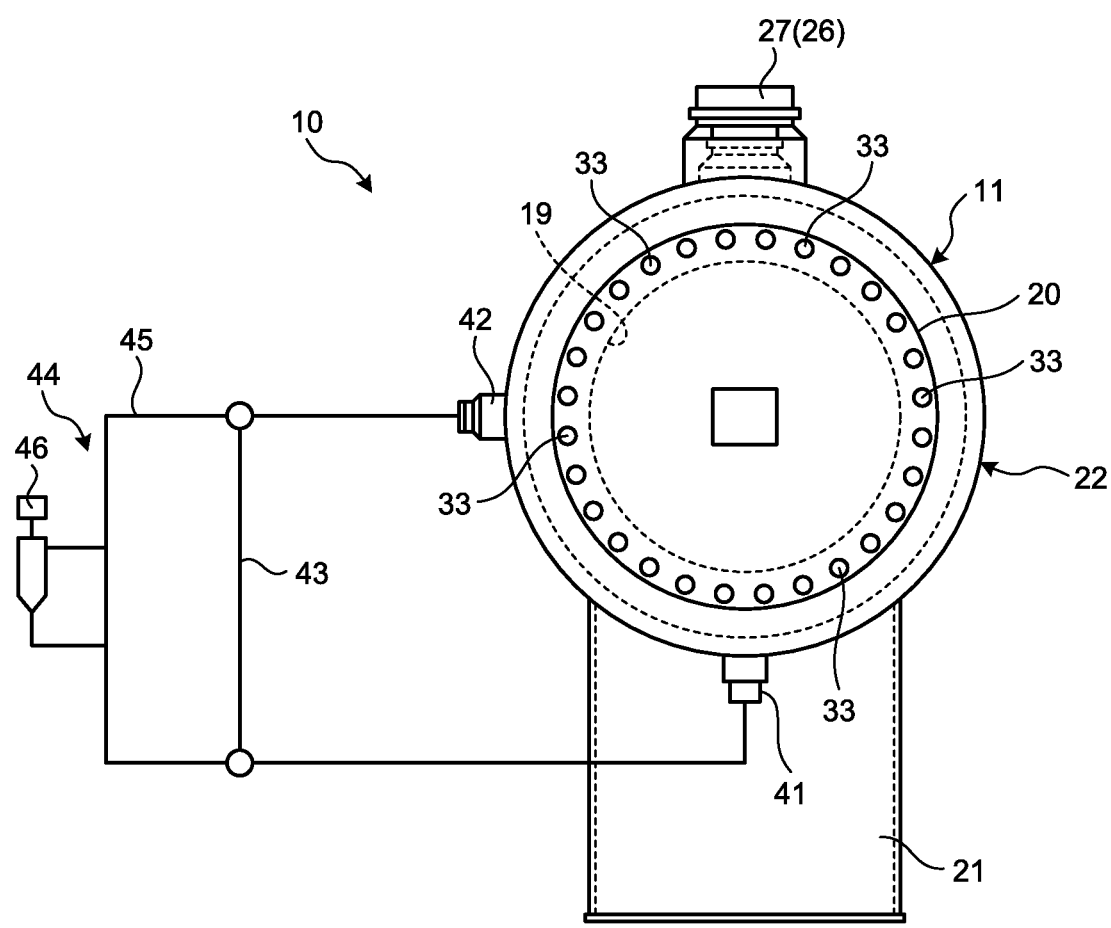
FIG. 2 is a front elevation view of the fuel gas heater.
Figure 3:
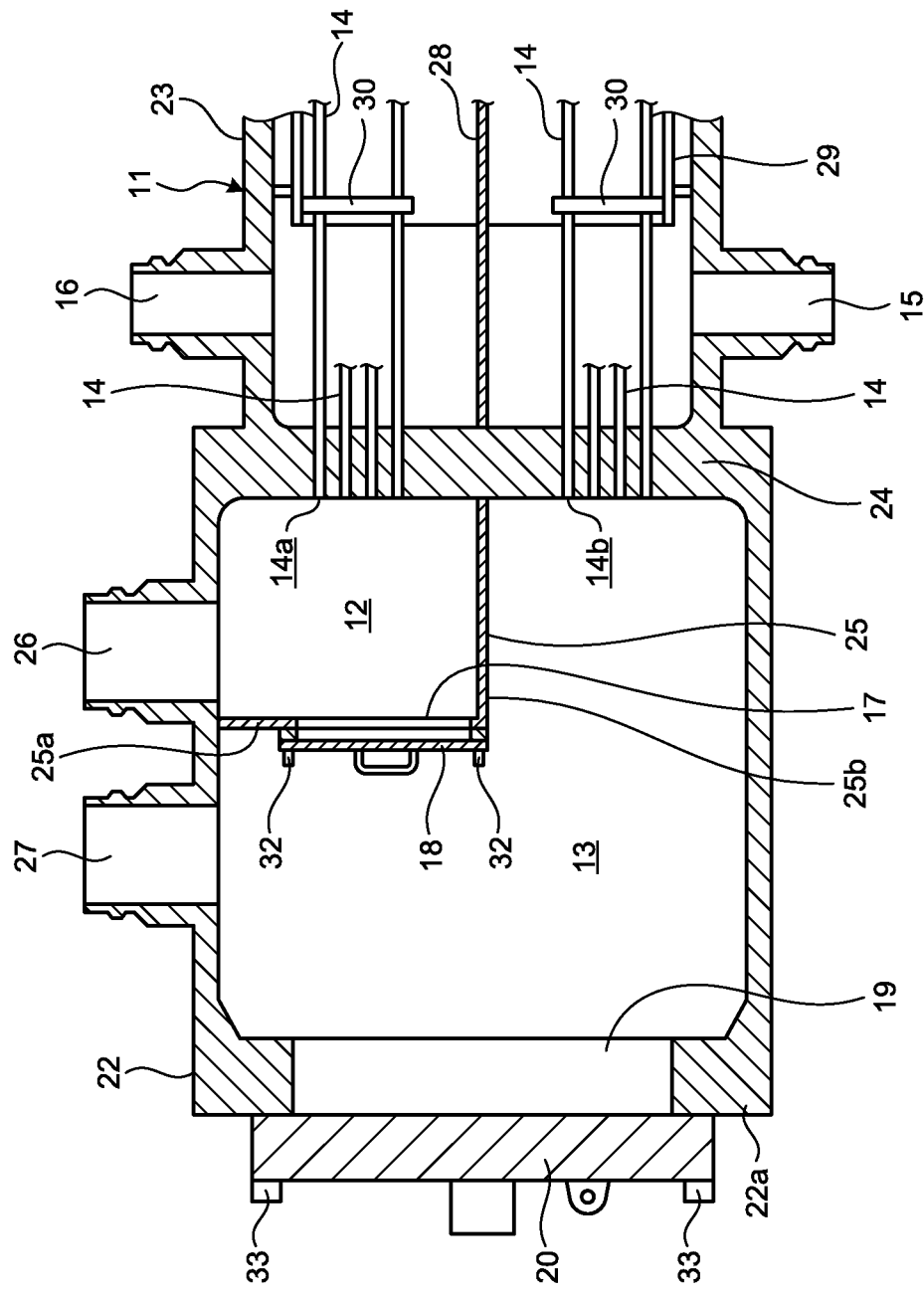
FIG. 3 is a cross-sectional view of a gas inflow chamber and a gas outflow chamber in the fuel gas heater.
Figure 4:
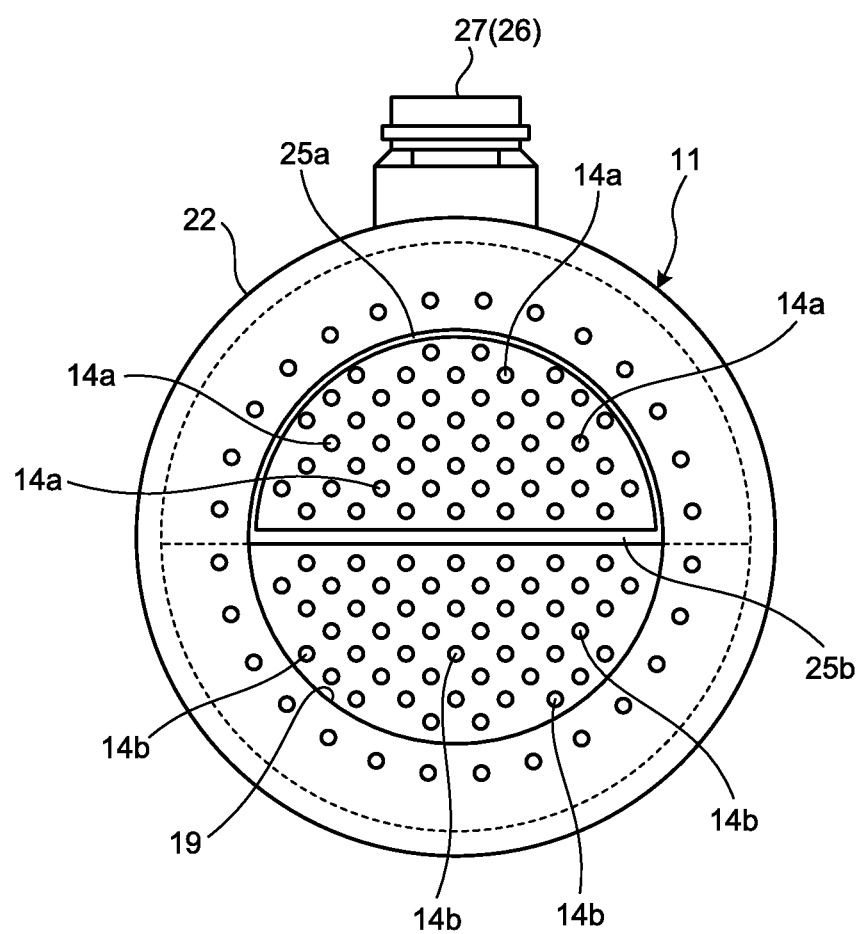
FIG. 4 is a schematic view of the gas inflow chamber and the gas outflow chamber from which open/close lids have been removed.

FIG. 1 is a longitudinal cross-sectional view of a fuel gas heater according to an embodiment. FIG. 2 is a front elevation view of the fuel gas heater. FIG. 3 is a cross-sectional view of a gas inflow chamber and a gas outflow chamber in the fuel gas heater. FIG. 4 is a schematic view of the gas inflow chamber and the gas outflow chamber from which open/close lids have been removed.

The fuel gas heater in the embodiment heats fuel gas supplied to a combustor of a gas turbine with boiler feed water as a heating medium to a predetermined supply temperature.

In the embodiment, as illustrated in FIGS. 1 to 4, this fuel gas heater 10 includes a container 11, a gas inflow chamber 12, a gas outflow chamber 13, a plurality of heat transfer pipes 14, a feed water supply port (heating medium supply port) 15, a feed water discharge port (heating medium discharge port) 16, a gas inflow chamber maintenance opening 17, a gas inflow chamber open/close lid 18, a gas outflow chamber maintenance opening 19, and a gas outflow chamber open/close lid 20.

The container 11 has a hollow cylindrical shape extending along a horizontal direction. The container 11 is disposed horizontally on legs 21 and has both end portions in a longitudinal direction closed to be hermitically sealed. The container 11 is configured to integrate a gas supply and discharge unit 22 with a feed water supply and discharge unit 23. Specifically, the container 11 includes a bulkhead 24 integrated therewith. The bulkhead 24 extends in a vertical direction inside the container 11 to thereby divide the inside into a first space S1 and a second space S2. The first space S1 is on the side of the gas supply and discharge unit 22. The second space S2 is on the side of the feed water supply and discharge unit 23. It is noted that the gas supply and discharge unit 22 has an outside diameter greater than an outside diameter of the feed water supply and discharge unit 23, and the first space S1 has an inside diameter greater than an inside diameter of the second space S2.

The gas supply and discharge unit 22 is disposed on one end portion in the longitudinal direction of the container 11. A partition wall 25 partitions the first space S1 into the gas inflow chamber 12 and the gas outflow chamber 13. The partition wall 25 includes a vertical wall 25a and a horizontal wall 25b. The vertical wall 25a is integrated with the horizontal wall 25b substantially at right angle to each other to form an L-shape. The partition wall 25 has an upper end portion of the vertical wall 25a joined to a ceiling of the gas supply and discharge unit 22 (first space S1), one end portion of the horizontal wall 25b joined to the bulkhead 24, and lateral end portions of the vertical wall 25a and the horizontal wall 25b joined to respective lateral portions of the gas supply and discharge unit 22 (first space S1). Thus, the gas inflow chamber 12 is disposed adjacent to the bulkhead 24 on an upper side in the first space S1, and the gas outflow chamber 13 is disposed on a lower side in the first space S1 and on a side closer to an end portion of the container 11 than the gas inflow chamber 12 is.

The gas supply and discharge unit 22 has a gas inlet 26 and a gas outlet 27, which are disposed at upper portions of the gas supply and discharge unit 22. A fuel gas G1 flows in the gas inlet 26. A heated fuel gas G2 is discharged from the gas outlet 27. The gas inlet 26 communicates with the gas inflow chamber 12. The gas outlet 27 communicates with the gas outflow chamber 13. The gas inlet 26 and the gas outflow chamber 13 are disposed in juxtaposition to, and spaced a predetermined distance away from, each other in the longitudinal direction (horizontal direction) of the container 11 at the upper portion of the gas supply and discharge unit 22.

The feed water supply and discharge unit 23 is disposed on another end portion in the longitudinal direction of the container 11. The feed water supply and discharge unit 23 houses thereinside the heat transfer pipes 14. Each of the heat transfer pipes 14 forms a U-shape. The heat transfer pipes 14 each have one end portion 14a and another end portion 14b. The one end portion 14a and the other end portion 14b are fitted in and supported by respective support holes in the bulkhead 24. The one end portion 14a on the upper side communicates with the gas inflow chamber 12 and the other end portion 14b on the lower side communicates with the gas outflow chamber 13. Additionally, the feed water supply and discharge unit 23 has the feed water supply port 15 and the feed water discharge port 16 on the side adjacent to the bulkhead 24 in the longitudinal direction. The feed water supply port 15 is disposed at a lower portion of the feed water supply and discharge unit 23. Boiler feed water W1 is supplied through the feed water supply port 15 to the second space S2. The feed water discharge port 16 is disposed at an upper portion of the feed water supply and discharge unit 23. Boiler feed water W2 is discharged through the feed water discharge port 16 from the second space S2. The feed water supply port 15 and the feed water discharge port 16 are disposed at a substantially identical position in the horizontal direction and are oppositely disposed in the vertical direction.

The feed water supply and discharge unit 23 includes a partition plate 28 disposed therein. The partition plate 28 extends horizontally and is disposed at an intermediate portion in the vertical direction in the second space S2. The partition plate 28 has one end portion in the longitudinal direction connected with the bulkhead 24 and another end portion in the longitudinal direction spaced a predetermined gap away from an inner wall surface on the other end portion in the longitudinal direction of the container 11. The partition plate 28 has each of lateral portions in the width direction connected with the inner wall surface of the container 11. The feed water supply and discharge unit 23 includes a frame unit 29 disposed outside each of the heat transfer pipes 14 in the second space S2. The frame unit 29 is supported by the inner wall surface of the feed water supply and discharge unit 23. A plurality of baffle plates 30 and 31 are fixed to the partition plate 28 and the frame unit 29. The baffle plates 30 and 31 are spaced a predetermined distance away from each other in the longitudinal direction of each of heat transfer pipes 14. The heat transfer pipes 14, which are housed in the feed water supply and discharge unit 23, are supported by the baffle plates 30 and 31. The baffle plates 30 and 31 are disposed to extend along the vertical direction and are spaced a predetermined distance away from each other in the longitudinal direction in the second space S2. The baffle plates 30 and 31 are disposed to alternate with each other in the horizontal direction and are staggered in the vertical direction.

Thus, the fuel gas G1, which has flowed in the gas inflow chamber 12 via the gas inlet 26, enters the one end portions 14a of the heat transfer pipes 14 and flows through the U-shape of the heat transfer pipes 14 before being discharged to the gas outflow chamber 13 via the other end portions 14b and then discharged to the outside via the gas outlet 27. Meanwhile, the boiler feed water W1, which has been supplied via the feed water supply port 15 to the second space S2 of the feed water supply and discharge unit 23, flows through the second space S2 toward a first side in the longitudinal direction along the partition plate 28. The boiler feed water W1 then changes direction to flow back toward a second side in the longitudinal direction before being discharged to the outside via the feed water discharge port 16. The boiler feed water W1, which has been supplied to the second space S2, flows in a zigzag manner so as to circumvent the baffle plates 30 and 31 in the second space S2. During this time, heat exchange takes place between the fuel gas G1, which flows through the heat transfer pipes 14, and the boiler feed water W1, which moves through the second space S2, so that the fuel gas G1 in the heat transfer pipes 14 is heated by the boiler feed water W1.

The partition wall 25, disposed in the first space S1, has the gas inflow chamber maintenance opening 17. The gas inflow chamber maintenance opening 17 is formed in the vertical wall 25a of the partition wall 25 and faces positions at which the one end portions 14a of the heat transfer pipes 14 communicate with the gas inflow chamber 12. The gas inflow chamber maintenance opening 17 is openable by the gas inflow chamber open/close lid 18. The gas inflow chamber open/close lid 18 is fastened to the vertical wall 25a of the partition wall 25 by a plurality of fastening bolts 32. In this case, the gas inflow chamber maintenance opening 17 has an opening area set to be greater than an area of regions over which the one end portions 14a of the heat transfer pipes 14 communicate with the gas inflow chamber 12. In addition, the one end portion in the longitudinal direction of the container 11, specifically, the gas supply and discharge unit 22 has the gas outflow chamber maintenance opening 19. The gas outflow chamber maintenance opening 19 is formed in a vertical wall 22a of the gas supply and discharge unit 22 and faces positions at which the other end portions 14b of the heat transfer pipes 14 communicate with the gas inflow chamber 12. The gas outflow chamber maintenance opening 19 is openable by the gas outflow chamber open/close lid 20. The gas outflow chamber open/close lid 20 is fastened to the vertical wall 22a of the gas supply and discharge unit 22 by a plurality of fastening bolts 33. In this case, the gas outflow chamber maintenance opening 19 has an opening area set to be greater than an area of regions over which the one end portions 14a of the heat transfer pipes 14 communicate with the gas inflow chamber 12. Additionally, the gas inflow chamber maintenance opening 17 faces a part of the gas outflow chamber maintenance opening 19.

Thus, when the gas inflow chamber open/close lid 18 and the gas outflow chamber open/close lid 20 are removed, the heat transfer pipes 14 has the one end portions 14a exposed to the outside of the container 11 through the gas inflow chamber maintenance opening 17 and the gas outflow chamber maintenance opening 19 and has the other end portions 14b exposed to the outside of the container 11 through the gas outflow chamber maintenance opening 19.

The container 11 has a leak water outlet (leak heating medium discharge port) 41 at a lower portion of the gas supply and discharge unit 22. Feed water that has leaked into the gas outflow chamber 13 is discharged through the leak water outlet 41. The container 11 further has a communication port 42 on a first side portion thereof. The leak water outlet 41 communicates with the communication port 42 through a communication pipe 43. A leak water detection device 44 is connected with the communication pipe 43. The leak water detection device 44 includes an inspection pipe 45 and a measuring instrument 46. The inspection pipe 45 provides communication between a lowermost portion and an uppermost portion of the communication pipe 43. The measuring instrument 46 measures a water level of leak water in the inspection pipe 45.

It is noted that the boiler feed water W1, which moves in the second space S2, has a temperature and pressure higher than a temperature and pressure of the fuel gas G1, which flows through the heat transfer pipes 14. Thus, when the heat transfer pipes 14 are partially damaged, for example, the boiler feed water W1 in the second space S2 enters the heat transfer pipes 14 through the damaged part and flows into the gas supply and discharge unit 22 through the heat transfer pipes 14. The boiler feed water W1, which has flowed in the gas supply and discharge unit 22, flows to the communication pipe 43 via the leak water outlet 41 and to the inspection pipe 45, which is connected with the communication pipe 43. The measuring instrument 46 measures the water level of the leak water in the inspection pipe 45 at this time. The measurement allows the boiler feed water W1, which has leaked through the heat transfer pipes 14, to be detected.

Figure 6:
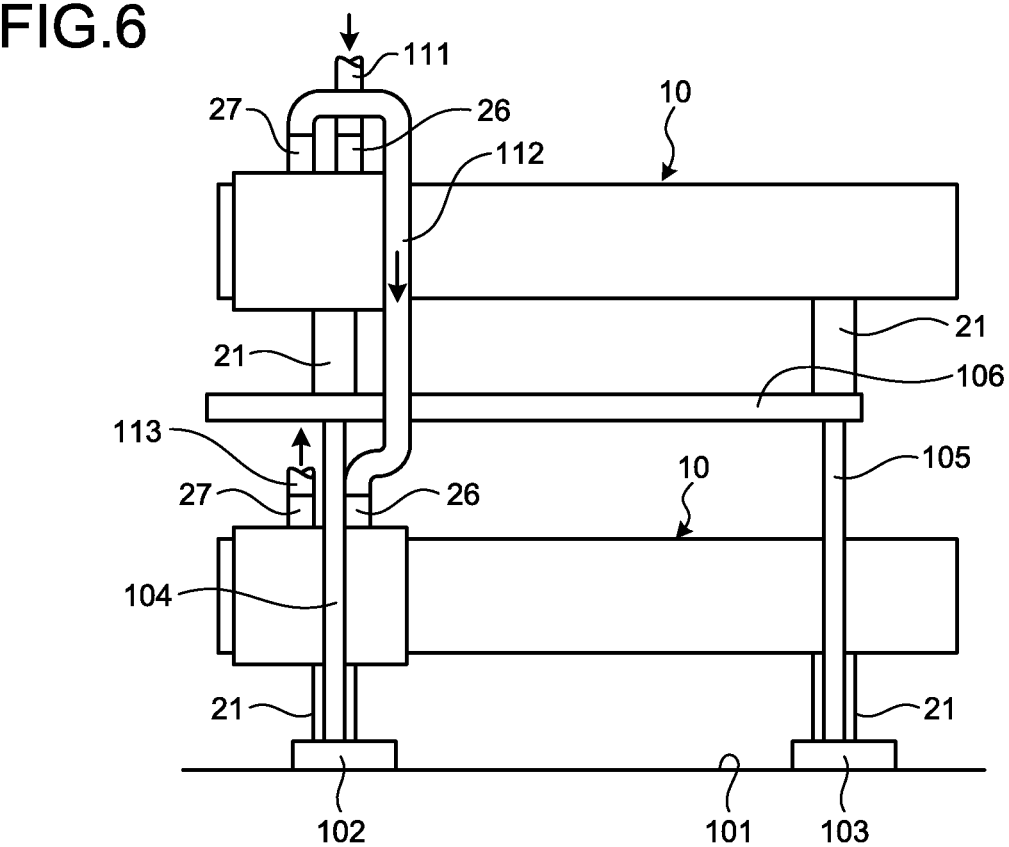
FIG. 6 is a side elevation view illustrating relative dispositions of the fuel gas heaters in the embodiment.
Figure 7:
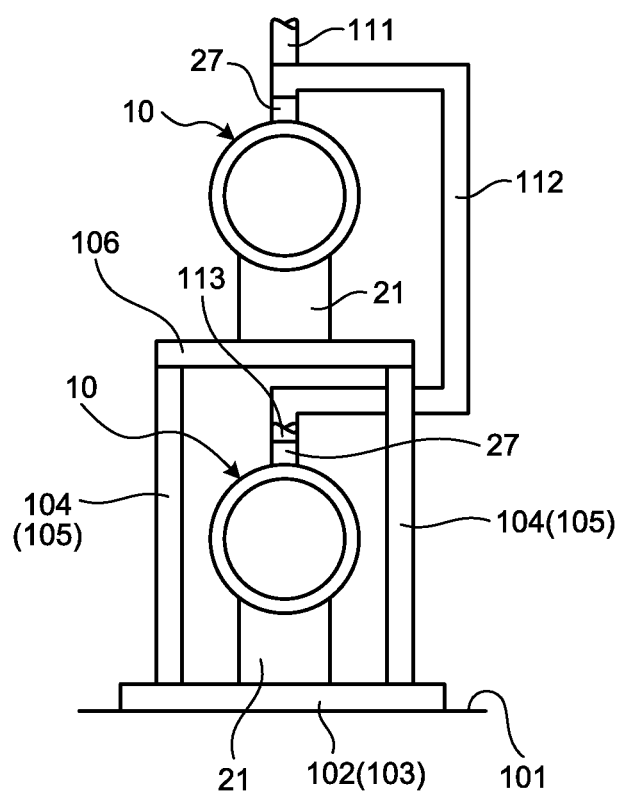
FIG. 7 is a front elevation view illustrating relative dispositions of the fuel gas heaters.

It is here noted that the fuel gas heater 10 described above is disposed in plurality (two in the embodiment) arranged in the vertical direction, one above the other. FIG. 6 is a side elevation view illustrating relative dispositions of the fuel gas heaters in the embodiment. FIG. 7 is a front elevation view illustrating relative dispositions of the fuel gas heaters.

As illustrated in FIGS. 6 and 7, two mounting bases 102 and 103 are placed to be spaced a predetermined distance away from each other on a floor surface 101. Two support columns 104 and 105 are erected on the respective mounting bases 102 and 103. A support pedestal 106 is supported in a horizontal position by the support columns 104 and 105. The fuel gas heaters 10 are disposed on the mounting bases 102 and 103 and supported by the legs 21, and disposed on the support pedestal 106 and supported by the legs 21.

A gas supply line 111 is connected with the gas inlet 26 of the fuel gas heater 10 disposed on the upper side and a gas discharge line 113 is connected with the gas outlet 27 of the fuel gas heater 10 disposed on the lower side. The gas outlet 27 of the fuel gas heater 10 on the upper side is connected with the gas inlet 26 of the fuel gas heater 10 on the lower side by a gas connection line 112. In this case, the gas connection line 112 is disposed along the vertical direction on a side closer to the support column 104 than to the support column 105 and outside the support pedestal 106. The gas connection line 112 has an upper end portion bent in the horizontal direction and then in the vertical direction before being connected with the gas outlet 27 of the fuel gas heater 10 on the upper side. The gas connection line 112 has a lower end portion bent in the horizontal direction and then in the vertical direction before being connected with the gas inlet 26 of the fuel gas heater 10 on the lower side.

Specifically, because the fuel gas heater 10 is heavy and the gas supply and discharge unit 22 is particularly heavy, the support column 104 is disposed at a position substantially identical to positions at which the gas inlet 26 and the gas outlet 27 are disposed in the longitudinal direction of the fuel gas heater 10. Thus, the gas inlet 26 and the gas outlet 27 are provided on the upper portion of the fuel gas heater 10 and thereby the gas connection line 112 is prevented from interfering with the support column 104 or the support pedestal 106.

Figure 5:
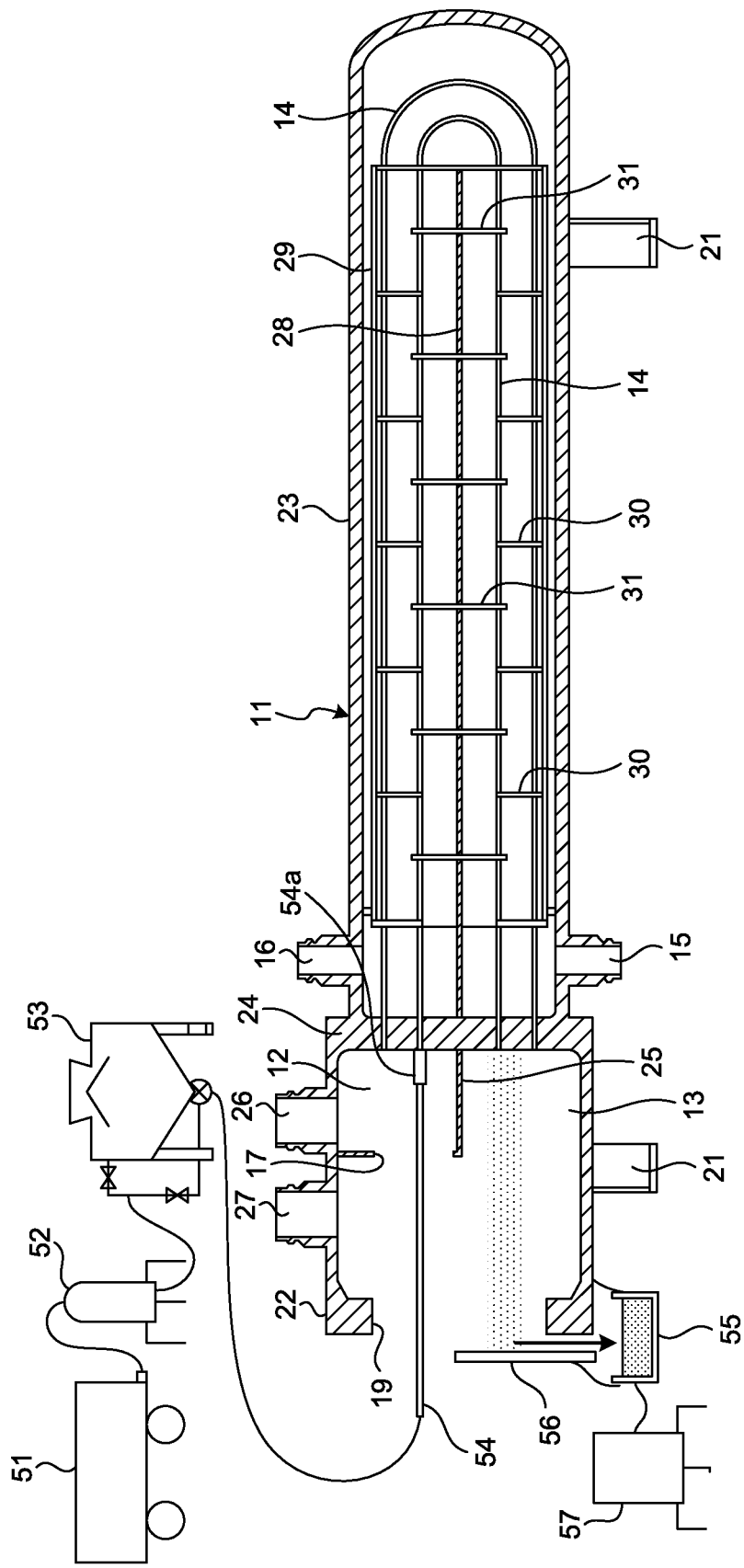
FIG. 5 is a schematic view illustrating a method for cleaning the fuel gas heater.

The following describes a method for cleaning the fuel gas heater in the embodiment. FIG. 5 is a schematic view illustrating the method for cleaning the fuel gas heater.

A cleaning apparatus for the fuel gas heater in the embodiment includes a compressor 51, a drain 52, a sand box 53, a cleaning nozzle 54, a recovery box 55, a collision plate 56, and a precipitator 57.

The method for cleaning the fuel gas heater in the embodiment includes a step of removing the gas inflow chamber open/close lid 18 and the gas outflow chamber open/close lid 20, a step of inserting the cleaning nozzle 54 in the gas inflow chamber 12 through the gas outflow chamber maintenance opening 19 and the gas inflow chamber maintenance opening 17, and a step of injecting a blast cleaning material from the cleaning nozzle 54 into the one end portions 14a of the heat transfer pipes 14. The method for cleaning the fuel gas heater in the embodiment further includes a step of causing the blast cleaning material discharged from the other end portions 14b of the heat transfer pipes 14 to collide against the collision plate 56 and to be recovered in the recovery box 55.

More specifically, as illustrated in FIG. 3, the fastening bolts 33 are loosened to remove the gas outflow chamber open/close lid 20 at the gas supply and discharge unit 22 of the container 11 and the fastening bolts 32 are then loosened to remove the gas inflow chamber open/close lid 18. As illustrated in FIG. 4, the foregoing step allows the other end portions 14b of the heat transfer pipes 14, which are exposed to the gas outflow chamber 13, to be viewed from the outside of the container 11 through the gas outflow chamber maintenance opening 19 and allows the one end portions 14a of the heat transfer pipes 14, which are exposed to the gas inflow chamber 12, to be viewed from the outside of the container 11 through the gas outflow chamber maintenance opening 19 and the gas inflow chamber maintenance opening 17.

Reference is now made to FIG. 5. The cleaning nozzle 54 is connected with the compressor 51 via the drain 52 and the sand box 53. Additionally, the collision plate 56 is placed along the vertical direction so as to block a lower portion side of the gas outflow chamber maintenance opening 19 in the gas supply and discharge unit 22, the recovery box 55 is placed at a position lower to the collision plate 56, and the precipitator 57 is connected. It is noted that the drain 52 assumes a storage for compressed air and the sand box 53 assumes a storage for a cut wire as the blast cleaning material.

Under the foregoing condition, the cleaning nozzle 54 is advanced into the gas inflow chamber 12 via the gas outflow chamber maintenance opening 19 and the gas inflow chamber maintenance opening 17 to thereby insert a nozzle distal end portion 54a in the one end portion 14a of the heat transfer pipe 14. Then, valves are opened and the blast cleaning material is injected by the compressed air from the cleaning nozzle 54 into the heat transfer pipe 14. The foregoing step causes the blast cleaning material to be injected from the one end portion 14a into the heat transfer pipe 14 and to move through the inside of the heat transfer pipe 14. The blast cleaning material thereby shaves a foreign object stuck on the inner wall surface of the heat transfer pipe 14 off the inner wall surface of the heat transfer pipe 14. The blast cleaning material and the foreign object removed by the blast cleaning material are discharged from the other end portion 14b of the heat transfer pipe 14. It is noted that the cut wire as the blast cleaning material is bar-shaped. Thus, corners of the bar shape collide against the foreign object stuck on the inner wall surface of the heat transfer pipe 14, so that the stuck foreign object can be easily shaved off without the inner wall surface of the heat transfer pipe 14 being damaged. In addition, the movement of the blast cleaning material injected from the one end portion 14a of the heat transfer pipe 14 through the U-shaped heat transfer pipe 14 results in a circling motion, so that the foreign object stuck on the inner wall surface of the heat transfer pipe 14 can be efficiently shaved off. The blast cleaning material and the foreign object discharged from the other end portion 14b of the heat transfer pipe 14 thereafter collide against the collision plate 56 to thereby be fallen down and recovered in the recovery box 55. The precipitator 57 then removes the foreign object from the blast cleaning material recovered in the recovery box 55 and the residual blast cleaning material is to be re-used.

As described above, the fuel gas heater in the embodiment includes: the hollow container 11; the gas inflow chamber 12, which is defined in the one end portion of the container 11 and which has the gas inlet 26 for fuel gas; the gas outflow chamber 13, which is defined in the one end portion of the container 11 and which has the gas outlet 27 for the fuel gas; the U-shaped heat transfer pipes 14, which are housed in the container 11 and which have the one end portions 14a communicating with the gas inflow chamber 12 and the other end portions 14b communicating with the gas outflow chamber 13; the feed water supply port 15, through which the boiler feed water W1 is supplied to the inside of the container 11; the feed water discharge port 16, through which the boiler feed water W2 is discharged from the inside of the container 11; the gas inflow chamber maintenance opening 17, which is disposed to face the one end portions 14a at which the heat transfer pipes 14 communicate with the gas inflow chamber 12; the gas inflow chamber open/close lid 18, which can open or close the gas inflow chamber maintenance opening 17; the gas outflow chamber maintenance opening 19, which is disposed to face the other end portions 14b at which the heat transfer pipes 14 communicate with the gas outflow chamber 13; and the gas outflow chamber open/close lid 20, which can open or close the gas outflow chamber maintenance opening 19.

Thus, the removal of the gas inflow chamber open/close lid 18 and the gas outflow chamber open/close lid 20 from the container 11 allows the one end portions 14a and the other end portions 14b of the heat transfer pipes 14 to be viewed from the outside, so that the injection of the blast cleaning material by the compressed air from the cleaning nozzle 54, which is inserted in the one end portion 14a of the heat transfer pipe 14, enables the foreign object stuck on the inner wall surface of the heat transfer pipe 14 to be shaved off by the blast cleaning material that moves through the inside of the heat transfer pipe 14. As a result, maintenance of the heat transfer pipes 14 can be performed easily within a short period of time and dismantling of, for example, the container 11 and the heat transfer pipes 14 can be eliminated for reduction in maintenance cost.

In the fuel gas heater in the embodiment, the inside of the container 11 is divided by the bulkhead 24 into the first space S1 and the second space S2, the gas inflow chamber 12 is disposed adjacent to the bulkhead 24 on the upper side in the first space S1, the gas outflow chamber 13 is disposed on the lower side in the first space S1 and on the side adjacent to the end portion of the container 11, the heat transfer pipes 14 are disposed in the second space S2, and the heat transfer pipes 14 have the one end portions 14a and the other end portions 14b passing through the bulkhead 24. Thus, because of the gas inflow chamber 12 and the gas outflow chamber 13 being disposed on the upper side in the first space S1, the gas inlet 26 and the gas outlet 27 for the fuel gas can be disposed on the same side in the first space S1, which leads to reduction in manufacturing cost. In addition, the disposition of a main stream line of the fuel gas along an upper-lower direction eliminates the need for separately providing, for example, a drain nozzle (draining line) and a vent nozzle (for bleeding gas) in the main stream line, so that the configuration can be simplified.

The fuel gas heater in the embodiment has the gas inlet 26 and the gas outlet 27 disposed in juxtaposition to each other in the longitudinal direction at the upper portion of the container 11. When a plurality of fuel gas heaters 10 are disposed vertically, support structures including columns and beams are disposed on sides of the fuel gas heater 10 on the lower side. This makes difficult the disposition of structures for use with the fuel gas heater 10. Thus, by disposing the gas inlet 26 and the gas outlet 27 at the upper portion of the container 11, the lines to be connected with the gas inlet 26 and the gas outlet 27 can be disposed so as to circumvent the support columns 104 and 105. The lines can thus be disposed easily and the configuration can be simplified.

In the fuel gas heater in the embodiment, the first space S1 is partitioned by the partition wall 25, which includes the vertical wall 25a and the horizontal wall 25b, to thereby define the gas inflow chamber 12 and the gas outflow chamber 13, the gas outflow chamber maintenance opening 19 is disposed at the one end portion in the longitudinal direction of the container 11, and the gas inflow chamber maintenance opening 17 is disposed in the vertical wall 25a. The foregoing configuration enables the gas outflow chamber maintenance opening 19 and the gas inflow chamber maintenance opening 17 to be disposed at positions at which the gas outflow chamber maintenance opening 19 and the gas inflow chamber maintenance opening 17 face the one end portions 14a and the other end portions 14b of the heat transfer pipes 14.

In the fuel gas heater in the embodiment, the one end portions 14a of the heat transfer pipes 14 are exposed to the outside of the container 11 through the gas outflow chamber maintenance opening 19 and the gas inflow chamber maintenance opening 17 and the other end portions 14b of the heat transfer pipes 14 are exposed to the outside of the container 11 through the gas outflow chamber maintenance opening 19. The foregoing configuration enables the one end portions 14a and the other end portions 14b of the heat transfer pipes 14 to be exposed to the outside of the container 11 through the gas inflow chamber maintenance opening 17 and the gas outflow chamber maintenance opening 19, respectively, so that workability in maintenance work of the heat transfer pipes 14 can be enhanced.

In the fuel gas heater in the embodiment, the container 11 has the leak water outlet 41 disposed at a lower portion thereof. The boiler feed water W2, which has leaked to the gas outflow chamber 13, is discharged through the leak water outlet 41. Thus, the boiler feed water W2, which has leaked from the second space S2 to the gas outflow chamber 13 through a damaged part in the heat transfer pipes 14, can be easily discharged to the outside.

In the fuel gas heater in the embodiment, the leak water detection device 44 is connected with the leak water outlet 41. Thus, damage in the heat transfer pipes 14 can be easily detected by detecting leakage of the boiler feed water W2 from the leak water outlet 41. Additionally, the gas outlet 27 is disposed at the upper portion of the container 11. Thus, the boiler feed water W2, which has leaked to the gas outflow chamber 13, can be prevented from being discharged from the gas outlet 27 and flowing to a fuel supply pipe of the combustor.

In the support structure for the fuel gas heater, the support pedestal 106 is supported by the support columns 104 and 105 placed on the mounting bases 102 and 103 on the floor surface 101. The fuel gas heaters 10 are disposed on the mounting bases 102 and 103 and on the support pedestal 106, respectively, and the support columns 104 are disposed alongside the gas inflow chamber 12 and the gas outflow chamber 13.

Because the support columns 104 are disposed alongside a heavy portion of the fuel gas heater 10 and the gas inlet 26 or the gas outlet 27 is not disposed laterally, the support columns 104 can be disposed close to the fuel gas heater 10, so that the support structure can be configured reasonably and compactly. The first space S1 in the fuel gas heater 10 hitherto known is disposed close to the bulkhead 24 and is heavier than the portion of the heat transfer pipes 14, which has a thin wall thickness and is light in weight. With the fuel gas heater 10 in the embodiment, the first space S1 is extended in the longitudinal direction to thereby provide the gas inflow chamber maintenance opening 17 and the gas outflow chamber maintenance opening 19, and the gas inflow chamber open/close lid 18 and the gas outflow chamber open/close lid 20, which can open the gas inflow chamber maintenance opening 17 and the gas outflow chamber maintenance opening 19, respectively, resulting in an increased weight compared with the hitherto known fuel gas heater. The support structure in the embodiment is configured such that a load on a portion on which a heavy weight acts can be reasonably borne and the fuel gas heater 10 and the support structure including the support columns 104 and 105 can be narrowed in width. Thus, the support structure for the fuel gas heaters 10 disposed in a two-tier configuration can be built simply.

The method for cleaning the fuel gas heater in the embodiment includes a step of removing the gas inflow chamber open/close lid 18 and the gas outflow chamber open/close lid 20, a step of inserting the cleaning nozzle 54, which has a length in the horizontal direction longer than the length of the gas inflow chamber 12 and the gas outflow chamber 13, in the gas inflow chamber 12 through the gas outflow chamber maintenance opening 19 and the gas inflow chamber maintenance opening 17, and a step of injecting the blast cleaning material from the cleaning nozzle 54 into the one end portions 14a of the heat transfer pipes 14.

Thus, the removal of the gas inflow chamber open/close lid 18 and the gas outflow chamber open/close lid 20 from the container 11 allows the one end portions 14a and the other end portions 14b of the heat transfer pipes 14 to be viewed from the outside, so that the injection of the blast cleaning material by the compressed air from the cleaning nozzle 54, which is inserted in the one end portion 14a of the heat transfer pipe 14, enables the foreign object stuck on the inner wall surface of the heat transfer pipe 14 to be shaved off by the blast cleaning material that moves through the inside of the heat transfer pipe 14. As a result, maintenance of the heat transfer pipes 14 can be performed easily within a short period of time and dismantling of, for example, the container 11 and the heat transfer pipes 14 can be eliminated for reduction in maintenance cost.

The method for cleaning the fuel gas heater in the embodiment further includes a step of causing the blast cleaning material discharged from the other end portions 14b of the heat transfer pipes 14 to collide against the collision plate 56 and to be recovered in the recovery box 55. Thus, the blast cleaning material can be easily recovered and re-used.

It is noted that relative positions of the gas inflow chamber 12 and the gas outflow chamber 13 of the fuel gas in the embodiment described above are illustrative only and may be reversed. Additionally, relative positions of the feed water supply port (heating medium supply port) 15 and the feed water discharge port (heating medium discharge port) 16 may also be reversed.

REFERENCE SIGNS LIST

10 Fuel gas heater
11 Container
12 Gas inflow chamber
13 Gas outflow chamber
14 Heat transfer pipe
15 Feed water supply port (heating medium supply port)
16 Feed water discharge port (heating medium discharge port)
17 Gas inflow chamber maintenance opening
18 Gas inflow chamber open/close lid
19 Gas outflow chamber maintenance opening
20 Gas outflow chamber open/close lid
22 Gas supply and discharge unit
23 Feed water supply and discharge unit
24 Bulkhead
25 Partition wall
26 Gas inlet
27 Gas outlet
41 Leak water outlet (leak heating medium discharge port)
42 Communication port
43 Communication pipe
44 Leak water detection device
45 Inspection pipe
46 Measuring instrument
51 Compressor
52 Drain
53 Sand box
54 Cleaning nozzle
55 Recovery box
56 Collision plate
57 Precipitator
101 Floor surface
102, 103 Mounting base
104, 105 Support column
106 Support pedestal
111 Gas supply line
112 Gas connection line
113 Gas discharge line

The invention claimed is:

1. A fuel gas heater, comprising:
a container having a hollow shape extending in a horizontal direction;
a gas inflow chamber defined in one end portion in a longitudinal direction of the container and having a gas inlet for fuel gas;
a gas outflow chamber defined in the one end portion in the longitudinal direction of the container and having a gas outlet for the fuel gas;
a plurality of U-shaped heat transfer pipes disposed in an inside of the container, the heat transfer pipes each having one end portion communicating with the gas inflow chamber and another end portion communicating with the gas outflow chamber;
a heating medium supply port through which a heating medium is supplied to the inside of the container;
a heating medium discharge port through which the heating medium is discharged from the inside of the container;
a gas inflow chamber maintenance opening disposed to face positions at which the heat transfer pipes communicate with the gas inflow chamber;
a gas inflow chamber open/close lid that enables the gas inflow chamber maintenance opening to be opened and closed;
a gas outflow chamber maintenance opening disposed to face positions at which the heat transfer pipes communicate with the gas outflow chamber; and
a gas outflow chamber open/close lid that enables the gas outflow chamber maintenance opening to be opened and closed.

2. The fuel gas heater according to claim 1, wherein
the inside of the container is divided by a bulkhead extending along a vertical direction into a first space and a second space,
the gas inflow chamber is disposed adjacent to the bulkhead on an upper side in the first space,
the gas outflow chamber is disposed on a lower side in the first space and on the one end portion side of the container,
the heat transfer pipes are disposed in the second space, and
the end portions of the heat transfer pipes pass through the bulkhead.

3. The fuel gas heater according to claim 2, wherein the gas inlet and the gas outlet are disposed in juxtaposition to each other in the longitudinal direction of the container at an upper portion of the container.

4. The fuel gas heater according to claim 2, wherein
the first space is partitioned by a partition wall that includes a vertical wall extending along the vertical direction and a horizontal wall extending along the horizontal direction to define the gas inflow chamber and the gas outflow chamber,
the gas outflow chamber maintenance opening is disposed at the one end portion in the longitudinal direction of the container, and
the gas inflow chamber maintenance opening is disposed in the vertical wall.

5. The fuel gas heater according to claim 4, wherein the one end portions of the heat transfer pipes are exposed to an outside of the container through the gas inflow chamber maintenance opening and the gas outflow chamber maintenance opening, and the other end portions of the heat transfer pipes are exposed to the outside of the container through the gas outflow chamber maintenance opening.

6. The fuel gas heater according to claim 1, wherein the container has a leak heating medium discharge port, disposed at a lower portion of the container, through which the heating medium that has leaked to the gas outflow chamber is discharged.

7. The fuel gas heater according to claim 6, wherein a leak heating medium detection device is connected with the leak heating medium discharge port.

8. A support structure for a fuel gas heater, the support structure comprising:
a support pedestal supported by a plurality of support columns disposed on a floor surface, wherein
one fuel gas heater according to claim 3 is disposed on the floor surface and another fuel gas heater according to claim 3 is disposed on the support pedestal, and
the support columns are disposed alongside the gas inflow chamber or the gas outflow chamber.

9. A method for cleaning a fuel gas heater, the fuel gas heater comprising:
- a container having a hollow shape extending in a horizontal direction;
- a gas inflow chamber defined in one end portion in a longitudinal direction of the container and having a gas inlet for fuel gas;
- a gas outflow chamber defined in the one end portion in the longitudinal direction of the container and having a gas outlet for the fuel gas;
- a plurality of U-shaped heat transfer pipes disposed in an inside of the container, the heat transfer pipes each having one end portion communicating with the gas inflow chamber and another end portion communicating with the gas outflow chamber;
- a heating medium supply port through which a heating medium is supplied to the inside of the container;
- a heating medium discharge port through which the heating medium is discharged from the inside of the container;
- a gas inflow chamber maintenance opening disposed to face positions at which the heat transfer pipes communicate with the gas inflow chamber;
- a gas inflow chamber open/close lid that enables the gas inflow chamber maintenance opening to be opened and closed;
- a gas outflow chamber maintenance opening disposed to face positions at which the heat transfer pipes communicate with the gas outflow chamber; and
- a gas outflow chamber open/close lid that enables the gas outflow chamber maintenance opening to be opened and closed, the method comprising:
- removing the gas inflow chamber open/close lid and the gas outflow chamber open/close lid;
- inserting a cleaning nozzle in the gas inflow chamber through the gas outflow chamber maintenance opening and the gas inflow chamber maintenance opening, and
- injecting a blast cleaning material from the cleaning nozzle into the one end portions of the heat transfer pipes.

10. The method for cleaning a fuel gas heater according to claim 9, the method comprising a step of causing the blast cleaning material discharged from the other end portions of the heat transfer pipes to collide against a collision plate to recover the blast cleaning material in a recovery box.

* * * * *